(12) United States Patent
Hartmann

(10) Patent No.: US 6,598,907 B1
(45) Date of Patent: Jul. 29, 2003

(54) QUICK COUPLING DEVICE FOR TUBULAR COMPONENTS

(75) Inventor: Eduard Hartmann, Schneisingen (CH)

(73) Assignee: Bucher-Guyer AG, Niederweningen (CH)

( * ) Notice: Subject to any disclaimer, the term of this patent is extended or adjusted under 35 U.S.C. 154(b) by 0 days.

(21) Appl. No.: 09/701,708

(22) PCT Filed: Mar. 21, 2000

(86) PCT No.: PCT/CH00/00164

§ 371 (c)(1),
(2), (4) Date: Dec. 1, 2000

(87) PCT Pub. No.: WO00/60270

PCT Pub. Date: Oct. 12, 2000

(30) Foreign Application Priority Data

Apr. 1, 1999 (CH) .................................................. 631/99

(51) Int. Cl.[7] ............................................... F16L 37/14
(52) U.S. Cl. ..................... 285/305; 285/308; 285/320; 285/39
(58) Field of Search ............................... 285/305, 308, 285/320, 39

(56) References Cited

U.S. PATENT DOCUMENTS

| | | | | |
|---|---|---|---|---|
| 1,668,547 A | * | 5/1928 | Brandt | ........................ 285/261 |
| 2,399,133 A | * | 4/1946 | Midling | ....................... 403/316 |
| 3,314,696 A | | 4/1967 | Ferguson et al. | |
| 3,450,424 A | * | 6/1969 | Calisher | ....................... 285/305 |
| 3,625,551 A | * | 12/1971 | Branton et al. | .............. 285/305 |
| 3,628,768 A | * | 12/1971 | Hutt | ............................ 251/148 |
| 4,009,896 A | | 3/1977 | Brewer | |
| 6,179,345 B1 | * | 1/2001 | Gensert et al. | .............. 285/305 |

FOREIGN PATENT DOCUMENTS

| | | | | |
|---|---|---|---|---|
| DE | 4310192 | * | 2/1994 | .................. 285/305 |
| WO | 90/13752 | | 11/1990 | |

* cited by examiner

Primary Examiner—Lynne H. Browne
Assistant Examiner—G M Collins
(74) Attorney, Agent, or Firm—Burns, Doane, Swecker & Mathis, LLP

(57) ABSTRACT

A fast-action coupler for coupling a first tubular component (1) to a second tubular component (2) includes a spring wire (8) as a retaining unit. The spring wire (8) is secured to the second component (2) and with its end part (12) is resiliently fixed in a locking position for a retaining part (6) on the first component (1). The end part (12) can also be unlocked simply and even from relatively great distances, counter to the spring force of the spring wire (8), by rotation of a tool (19).

21 Claims, 8 Drawing Sheets

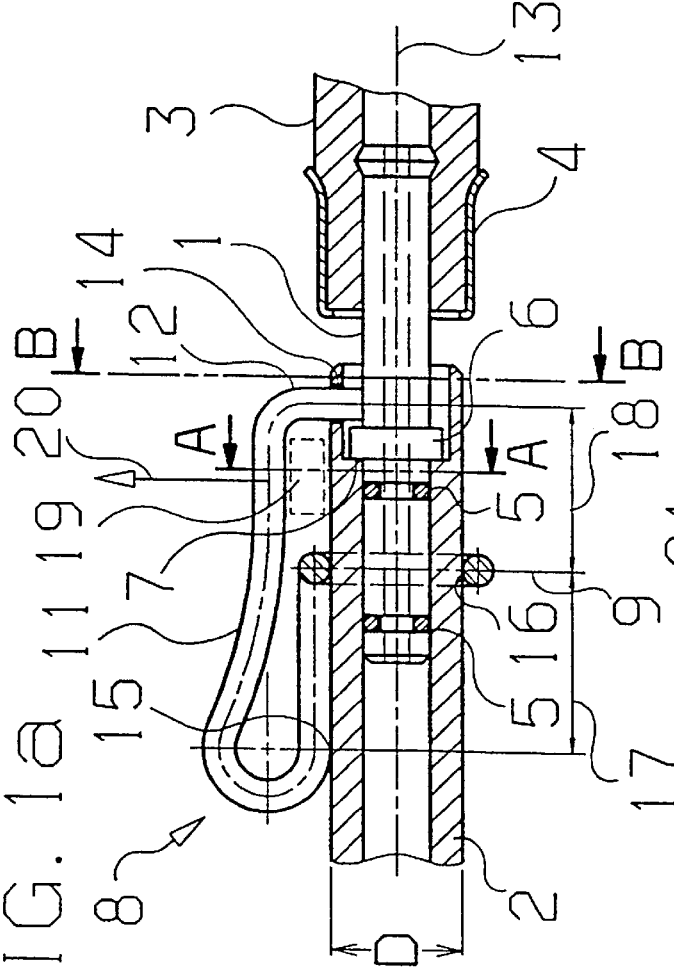
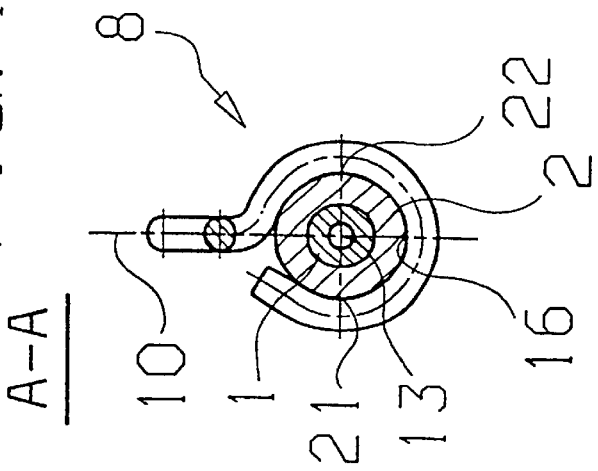
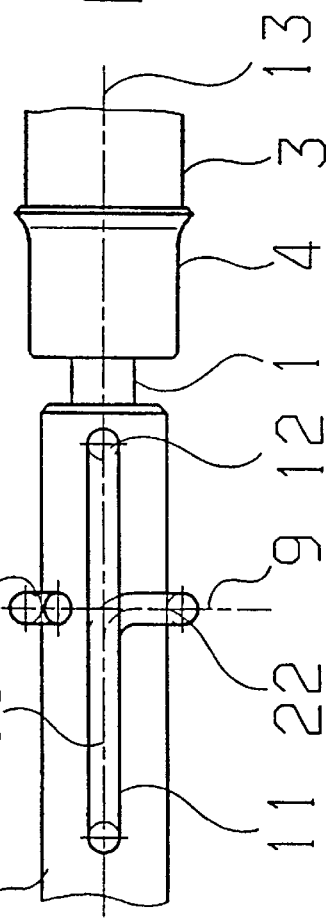

QUICK COUPLING DEVICE FOR TUBULAR COMPONENTS

FIELD OF THE INVENTION

The invention relates to a fast-action coupler for coupling a first tubular component to a second tubular component, in which in the coupling region the outer diameter of the first component is no greater than the inner diameter of the second component, having at least one bracing element on the first component and at least one opening in the second component for receiving an elastically deformable retaining unit, which is mounted on the first component or on the second component and secures the bracing element against being pulled out in the put-together state of the tubular components.

Such devices are used in systems in which many processing lines for a liquid have to be connected at one end to a supply line and at the other to a discharge line. The processing lines are subject to aging, which from time to time requires checking and necessitates a change. The fast-action couplers are intended to enable simple connection and disconnection of the processing lines and to assure reliable function, in a way compatible with foodstuffs, while requiring little space and having good accessibility.

PRIOR ART

A snap coupling for liquid lines is known from U.S. Pat. No. 3,847,393 (Busselmeier). It has an outer coupling element with a surrounding wall that has openings and that defines an interior. An inner coupling element can be thrust axially into the interior. An actuating element surrounds the outer coupling element on the outside and can be displaced axially into and out of a working position. A locking element has a number of lugs, which are biased through the openings of the outer coupling element and cooperate with protrusions on the inner coupling element and hold it back after the insertion. A disconnection device includes cooperating release and retaining parts on the actuating elements, which lift the lugs out of the interior when the actuating element is displaced into its working position.

A plug-type fast-action coupler for accordion hoses is also already known from German Patent Disclosure DE 196 15 442 A1 (to A. Gerich). It has a coupling body with an insertion region and an elastically deformable detent unit, disposed at an incline to the axis, that snaps into a corresponding recess on the accordion hose. The detent unit is disposed in the coupling body between two parallel slots and has a first and second formed-on spring element, which elements are coupled with one another via a film hinge.

Other known fast-action closures can be switched either by a rotary motion or via a pushbutton and also have many components. For certain applications, they have one or more of the following disadvantages:

poor accessibility and switchability in the installed position;

opening upon lateral impact;

hindrances to cleaning from outside;

inadequate suitability for contact with foodstuffs on all sides;

overly slight closing force;

requiring excessive space.

SUMMARY OF THE INVENTION

With the above prior art as the point of departure, the object of the invention is to refine the generic fast-action coupler in such a way that it has only a small number of components and requires little space, is readily accessible, so that economical assembly is assured, and is furthermore suited for processing foodstuffs.

The invention is defined by the characteristics of independent claim 1. Advantageous features and refinements are defined by characteristics of the dependent claims.

Accordingly, the fast-action coupler according to the invention of the generic type defined at the outset is distinguished in that the retaining unit is embodied as a one-piece spring wire, which is braced by a support at at least two points in a radial plane on the outer surface of the first component or second component and at at least one further point inside or outside the radial plane on respectively the first component or second component, and has at least one end oriented perpendicular to the axis of respectively the first tubular component or second tubular component, which end penetrates at least one opening in the second component, locks the bracing element on the first component, and can be lifted, counter to a spring force of the retaining unit, radially into an unlocking position.

In an especially preferred feature of the fast-action coupler of the invention, a first part of the spring wire is located in the radial plane with at least two support points, and a second part is located in a plane which extends perpendicular to this radial plane and coincides with the common axis of the two tubular components. In addition, the spring wire of the retaining unit has a portion on each locking end which, as a switching point, enables lifting of the end by means of a tool for the sake of unlocking.

A version of the invention that is especially easy to clean, with a view to use with foodstuffs, is distinguished in that the second tubular component, on its insertion end, on one side of its longitudinal axis, has a protrusionlike extension of its jacket, in which extension the opening for the locking end of the spring wire is disposed, and that the tubular components can be put together only far enough that the retaining flange on the first tubular component is flush with the short jacket end of the second tubular component and can be locked through the opening in the lengthened jacket end.

Furthermore embodiments and advantages of the invention will become apparent from the other characteristics recited in the claims and by the exemplary embodiments described below. The characteristics of the claims can be combined arbitrarily with one another, as long as they are not clearly mutually contradictory.

BRIEF DESCRIPTION OF THE DRAWING

The invention as well as advantageous embodiments and refinements of it will be described and explained in further detail below in terms of the examples shown in the drawing. The characteristics that can be learned from the description and the drawing can be employed according to the invention individually or in arbitrary combination of a plurality of them. Shown are:

FIG. 1a, a schematic sectional view of a fast-action coupler according to the invention, having a spring wire, braced on a tubular component, as a retaining unit;

FIG. 1b, a sectional view of the device of FIG. 1a taken along the section line A—A in FIG. 1a;

FIG. 1c, a schematic plan view of the device of FIG. 1a;

FIG. 2b, a schematic plan view of the device o f FIG. 2a;

FIG. 10a, a schematic cross section of an opening for a locking end of the spring wire in the tubular component of FIG. 1a;

FIG. 10b, a variant of an opening of FIG. 10a;

FIGS. 11a, 11b, 11c, schematic cross sections of bracing means of the spring wire in a radial plane on a tubular component of FIG. 1a;

FIGS. 12a, 12b, cross sections of a spring wire of FIG. 1a;

FIG. 13a, a schematic cross section of an arrangement of a plurality of fast-action couplers of FIG. 1a, with a switching tool for unlocking;

FIG. 13b, a cross section of the switching tool along the section line A—A of FIG. 13a;

FIG. 14b, a plan view on the device of FIG. 14a.

WAYS OF EMBODYING THE INVENTION

Figure 2A:
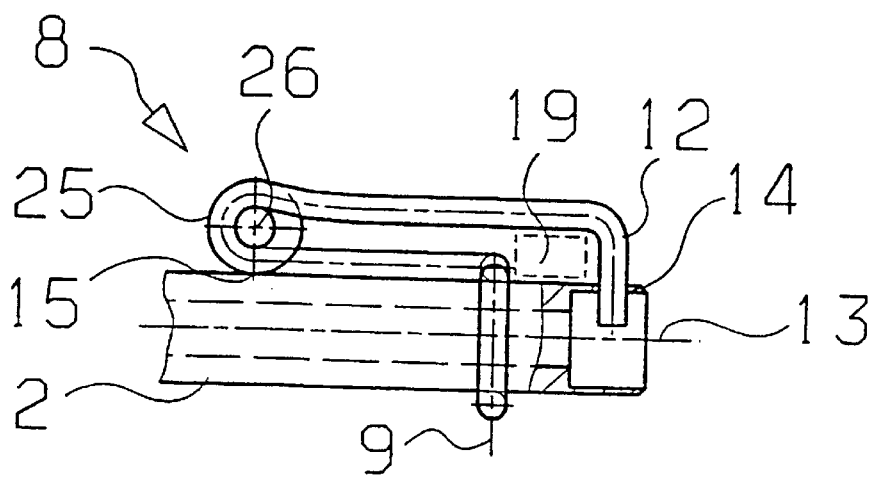
FIG. 2a, a variant of the device of FIG. 1a, in which one part of the spring wire has a spiral oriented transversely to the tubular component.

As the schematic sectional view of a fast-action coupler according to the invention in FIG. 1a shows, a first tubular component 1 is separably connected to a second tubular component 2 by inserting the ends into one another. The outer diameter of the first component 1 is equal to the inner diameter of the second component 2, whose outer diameter is in turn larger than that of the first component 1. The other end of the first component 1 is solidly connected to a hose 3, which extends onward, via a press sleeve 4.

The first component 1 is sealed off from the second component 2 by two O-rings and has a retaining flange 6, which is thrust into the second component 2 as far as a stop 7. As a retaining unit for the retaining flange 6, a spring wire 8 is secured to the second component 2. The spring wire 8, as the cross section in FIG. 1b along a sectional plane A—A shows in particular, wraps around the second component 2 in a radial plane 9 and then passes through a spring clip 11 in an axially located plane 10. An end 12 of the spring wire 8 adjoining the spring clip 11 is bent perpendicular to the common axis 13 of the components 1 and 2, penetrates a bore 14 in the wall of the second component 2, and rests resiliently on the first component 1, whose retaining flange 6 it engages in locking fashion from behind.

The spring wire 8 is accordingly braced at least by one support point 15 of the spring clip 11 and by one support point 16 in the radial plane 9 on opposed sides on the second component 2. The spacing 17 between the support point 15 and the radial plane 9 and the spacing 18 between the radial plane 9 and the end 12 of the spring wire 8 are preferably both approximately equal to twice the outer diameter 2D of the component 2. For lifting the end 12 in the direction of the arrow 20 upon opening of the fast-action coupler, a tool 19 is used, as shown in more detail in FIG. 13a. Upon lifting of the spring wire 8 in the direction of the arrow 20, a contrary torque is therefore received at the component 2 via support points 15 and 16. As the cross section in FIG. 1b shows, the resilient wrapping of the component 2 by the spring wire 8 in the radial plane 9 attains more than 180°. The longitudinal fixation of the spring wire 8 is therefore defined via diametrically opposed support points 21, 22 in the radial plane 9 and the bore 14 on the component 2.

Figure 2B:
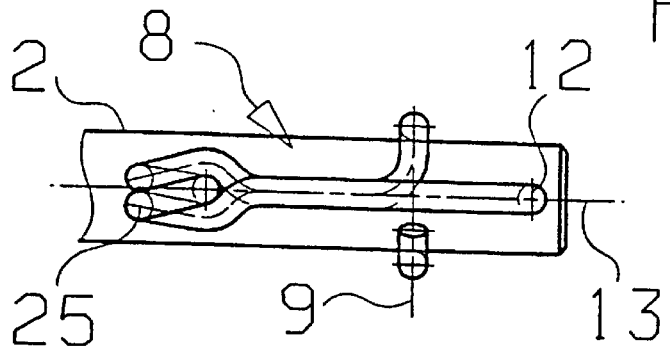

FIG. 2a in a fragmentary section shows a variant of the device of FIG. 1a, in which the same reference numerals indicate corresponding elements. The spring clip 11 of the spring wire 8 in FIG. 1a in addition, in FIG. 2a, has a spiral 25, whose axis 26 is transverse to the axis 13 of the second tubular component 2. The purpose of this spiral 25 is, in the event of especially large cross sections of the spring wire 8 under major retaining forces of the locking end 12 and under limited space conditions, to avoid overstretching of the spring. Such overstretching could otherwise occur when the end 12 of the spring wire 8 is lifted with the tool 19. FIG. 2b shows a plan view on the spring wire 8 and the spiral 25.

Figure 3:
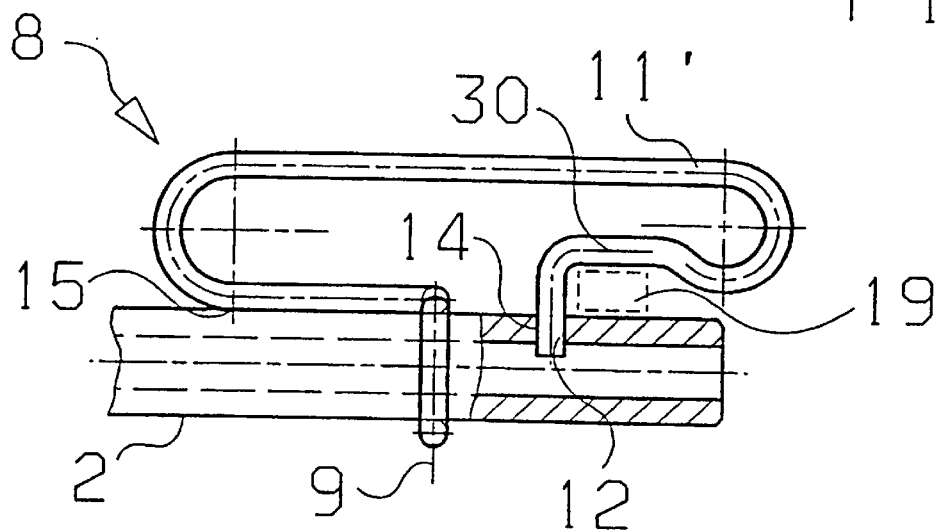
FIG. 3, a variant of the device of FIG. 1a, in which one part of the spring wire has a clip that protrudes past a locking opening on one end of the tubular component.

FIG. 3 shows a variant of the device of FIG. 1a, in which one part of the spring wire 8 has a clip 11', which protrudes past a locking opening 14 on one end of the second tubular component 2. By means of this embodiment, the part of the spring wire 8 that is resiliently effective for unlocking purposes upon lifting of the end 12 of the spring wire 8 is lengthened, thereby improving the spring properties. A portion 30 of the spring wire 8 that is effective as a switching point for the tool 19 is displaced toward end of the component 2 in FIG. 3, compared to the version of FIG. 1a.

Figure 4:
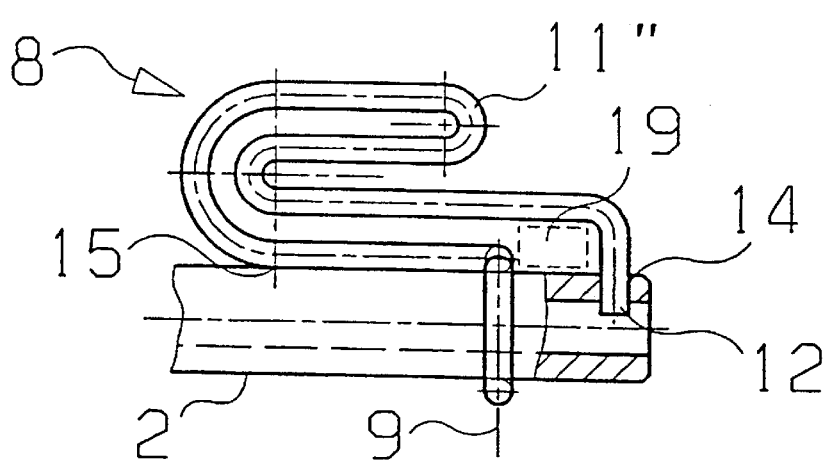
FIG. 4, a variant of the device of FIG. 1a, in which one part of the spring wire has a serpentine course.

A similar improvement in the spring properties is also attained in a version of the fast-action coupler of FIG. 4. Here, the part 11" of the spring wire 8 that is resiliently effective for the unlocking has a serpentine course.

Figure 5:
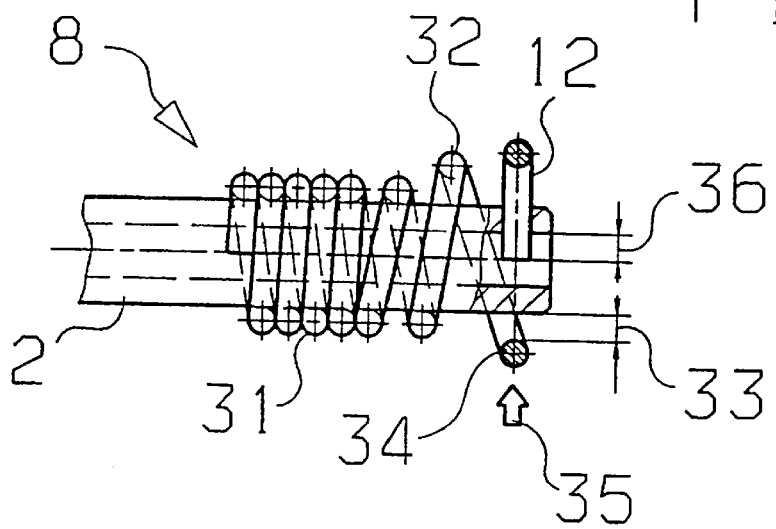
FIG. 5, a variant of the device of FIG. 1a, in which one part of the spring wire passes through a spiral, coaxial with the tubular component, that has conically widening windings.

FIG. 5 shows a variant of the device of FIG. 1a, in which one part of the spring wire 8 passes through a spiral that is coaxial to the second tubular component. This spiral includes a first part 31 with a number of windings that rest resiliently on the component 2 and serve the purpose of longitudinal fixation of the spring wire 8. A second part 32 of the spiral includes a number of windings that successively widen conically and the last of which, having the largest diameter, changes over into the locking end 12 of the spring wire 8. For unlocking, the winding that carries the end 12, on a part 34 diagonally opposite the end 12, has a spacing 33 above the component 2. If a suitable radial force is exerted on the part 34 in the direction of the arrow 35, the end 12 is lifted by a switching distance 36 and unlocks a retaining flange 6 of the type shown in FIG. 1a.

Figure 6:
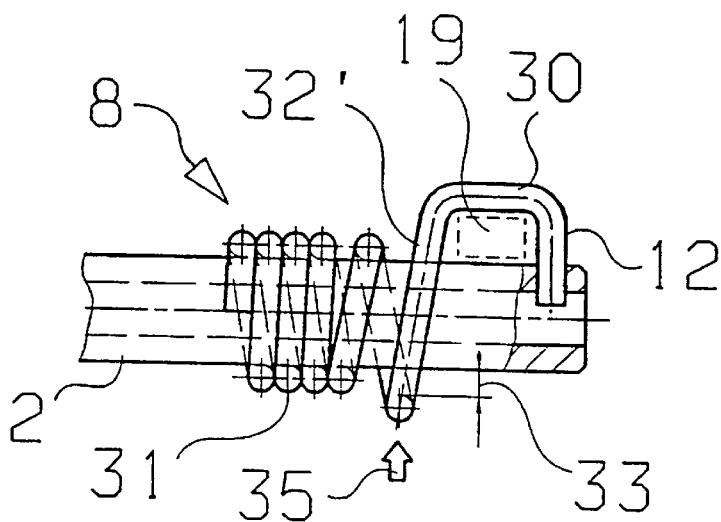
FIG. 6, a variant of the device of FIG. 1a, in which one part of the spring wire has a spiral, coaxial with the tubular component, that has an adjoining portion for lifting a locking end.

FIG. 6 also shows a variant of the device of FIG. 1a, in which one part of the spring wire 8 has a spiral, coaxial with the tubular component 2, with an adjoining portion for lifting a locking end 12. The spiral includes a first part 31, with a number of windings that rest resiliently on the component 2 and serve the purpose of longitudinal fixation of the spring wire 8. A second part 32' of the spiral includes a portion 30 of the spring wire 8, acting as a switching zone for the tool 19; the spacing between the spring wire 8 and the component 2 up to the portion 30 increases far enough that an introduction of the tool 19 and a lifting of the locking end 12 by a suitable distance 33 is possible. Such lifting for unlocking purposes can be done both with the switching tool 19 from a certain distance and by direct lateral pressure on the part 32' in the direction of the arrow 35.

Figure 7:
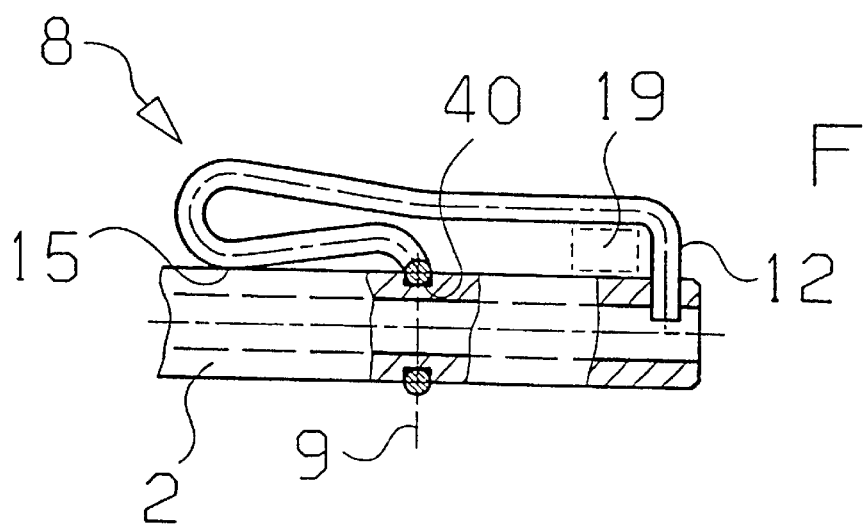
FIG. 7, a variant of the device of FIG. 1a, in which a part of the spring wire, braced in a radial plane on the tubular component, is fixed in a groove.

FIG. 7 shows a variant of the device of FIG. 1a, in which the part of the spring wire 8 braced in the radial plane 9 on the tubular component 2 is fixed in a groove 40. This version improves the fixation of the spring wire 8 on the component 2.

Figure 8:
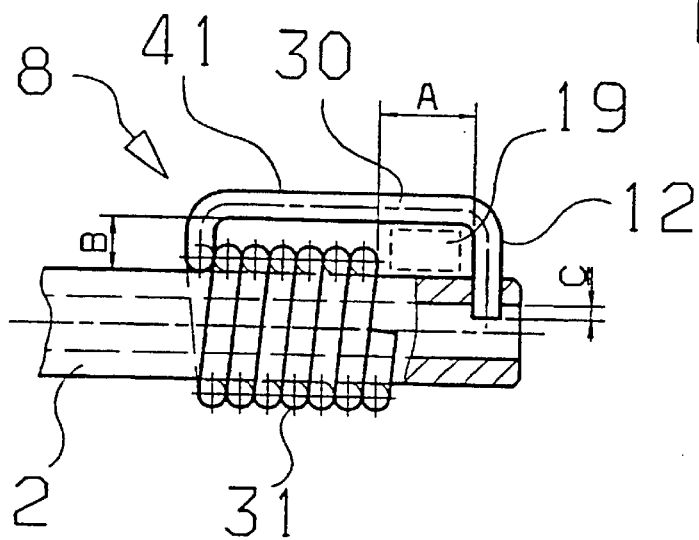
FIG. 8, a variant of the device of FIG. 1a, in which one part of the spring wire has a spiral, coaxial with the tubular component, that has a portion made to extend past the spiral for lifting a locking end.

FIG. 8 shows a variant of the device of FIG. 1a, in which one part of the spring wire 8 has a spiral 31 coaxial with the tubular component 2. A straightened part 41 of the spring wire 8 is extended above the spiral 31 and joins a portion 30, active as a switching point for the tool 19, with the adjoining end 12 for the locking. The combination of the spiral 31 with the straightened part 41 improves the spring properties of the retaining unit 8. The lifting of the end 12 for unlocking can be done without problems, as long as the spacing A between the spiral 31 and the end 12 of the spring wire 8 is greater than the sum of the spacing B between the straightened part 41 and the component 2 and the stroke C of the end 12 in the unlocking:

$$A > B + C.$$

Figure 9:
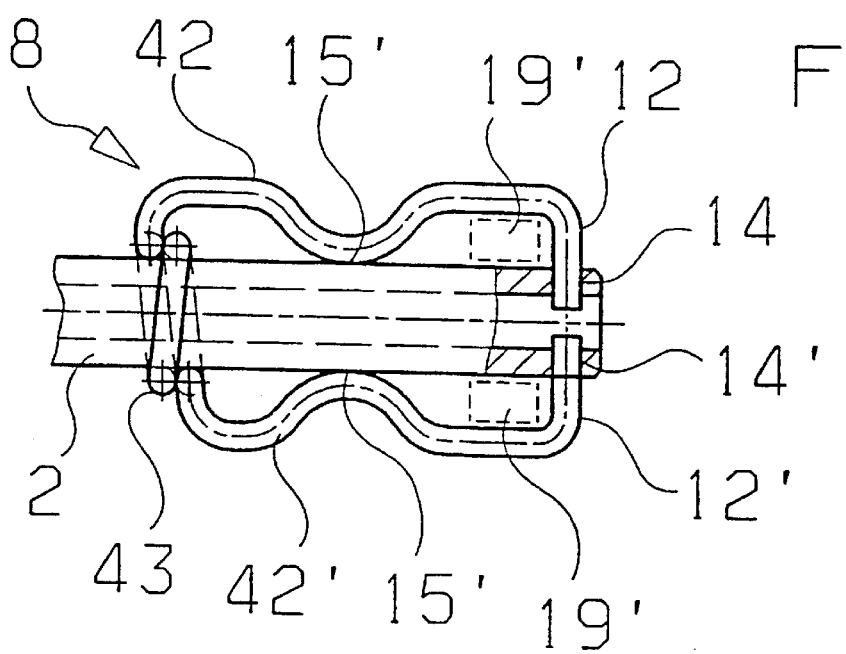
FIG. 9, a variant of the device of FIG. 1a, in which the spring wire includes two locking ends, which are braced on the tubular component via symmetrically disposed longitudinal brackets and a spiral winding.

FIG. 9 shows a variant of the device of FIG. 1a, in which the spring wire 8 includes two locking ends 12 and 12', which are braced on the tubular component 2 via two symmetrically arranged longitudinal bracket parts 42 and 42' along the component 2 and a spiral 43. In this version, one opening 14 and 14' for each end 12 and 12' is made in the component 2. For unlocking, in this case, a two-piece tool 19' with a spreading action is provided between the parts.

Figure 10A:
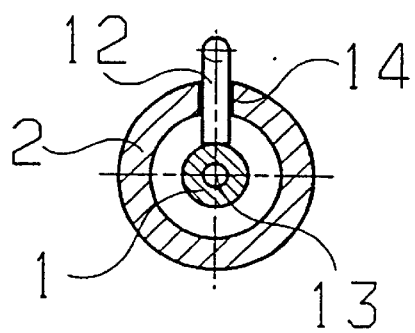
Figure 10B:
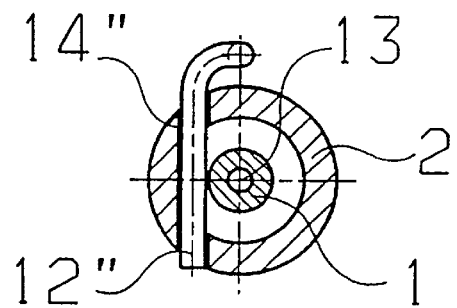

In the exemplary embodiments of FIGS. 1–9, all the ends 12, 12' of the spring wire 8, oriented perpendicular to the common axis 13 of the tubular components 1 and 2, are disposed radially in the component 2. A schematic cross section of this kind of end 12, disposed radially in an opening 14 in the component 2, is shown in FIG. 10a. FIG. 10b, in a radial section, shows a variant of the arrangement of FIG. 10a, in which one end 12" of the spring wire 8 of FIG. 1a extends through a suitable opening 14" in the component 2 past the axis 13 at a spacing that is equal to the outside radius of the first component 1. Compared to the arrangement of FIG. 1a, that of FIG. 1b has the advantage of greater retention security, although the spring clip 11 (FIG. 1a) acting as a rotation arm must be long enough that the change in orientation of the end 12" upon unlocking does not cause seizing in the opening 14'.

Figure 11A:
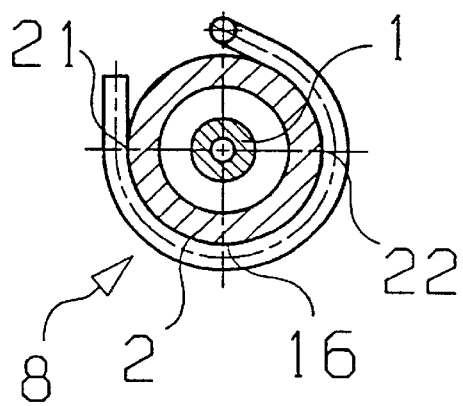
Figure 11B:
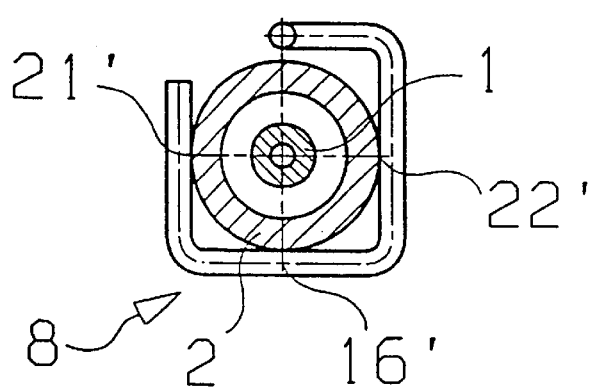
Figure 11C:
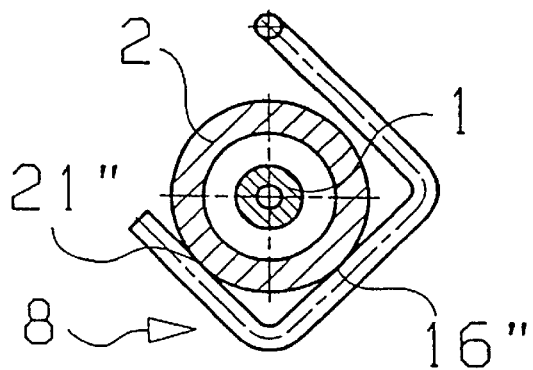

FIGS. 11a, 11b, 11c show schematic cross sections of bracing means of the spring wire 8 in a radial plane on a tubular component 2 of FIG. 1a. The bracing means of FIG. 11a corresponds to that of FIG. 1b, having the support points 16, 21, 22 and further support points along the circular wrapping of the spring wire 8. Only three isolated support points 16', 21', 22' of the spring wire 8 are shown in FIG. 1b, and as a result of the spring tension at the diametrically opposed support points 21', 22', a certain longitudinal fixation of the spring wire 8 to the tubular component 2 is still provided. An adequate longitudinal fixation exists in all cases, however, by the fixation of the end 12 of the spring wire 8 in the opening 14 of the component 2 (FIG. 1a). FIG. 11c shows that as a minimum, a support of the spring wire 8 in the radial plane 9 (FIG. 1a) at only two support points 16", 21" suffices, and the longitudinal fixation of the spring wire 8 is then taken over completely by the opening 14 (FIG. 1a).

Figure 12A:
Figure 12B:

FIGS. 12a, 12b show preferred cross sections of the spring wire 8 of FIG. 1a. Compared with the usual circular form of FIG. 12a, a rectangular form as in, FIG. 12b advantageously offers better longitudinal fixation by a support with one flat side in the radial plane 9 of FIG. 1a. A rectangular form as in FIG. 12b is also obtained if flat shapes of the spring wire 8, advantageously the spring clips 11, 11', 11", are precut from metal sheets using laser tools, and after that only parts that deviate from the plane are made to conform by bending.

Figures 13A, 13B:
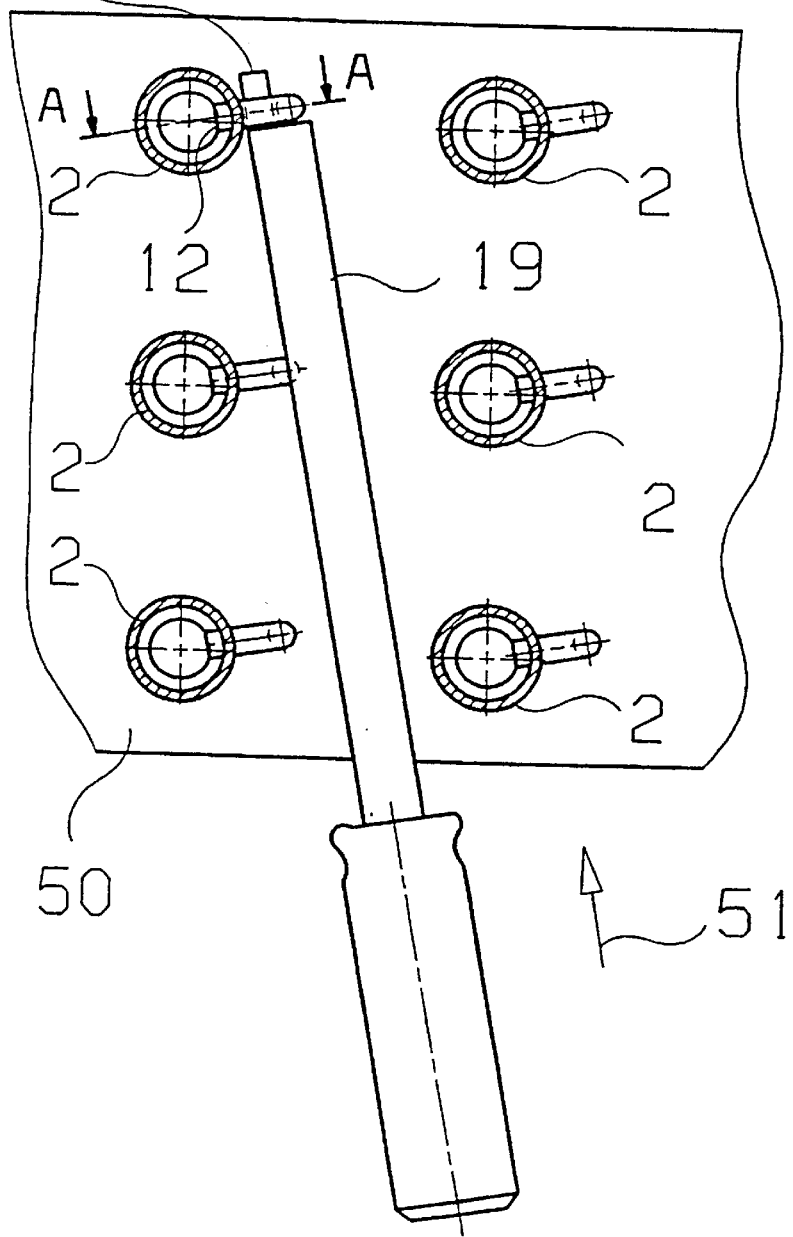

FIG. 13a shows a schematic cross section through an arrangement of a plurality of tubular components 2, which run as line connections into a collection plate 50. Each component 2 is equipped with a fast-action coupler of FIG. 1a. The sectional plane through the components 2 in FIG. 13a is marked B—B in FIG. 1a. FIG. 13a shows, along with the components 2 in the axial plan view, the locking ends 12 of the spring wires 8, which penetrate the components 2 in the openings 14 (FIG. 1a). It is assumed that the fast-action couplers of FIG. 13a are accessible for unlocking purposes only from one side in the direction of the arrow 51. This unlocking is done by means of the tool 19, which as the section A—A in FIG. 13b shows has a rectangular cross section. The tool 19 is introduced with a thinner end 19" between the spring wire 8 and the component 2 and because of its rectangular shape and by means of an ensuing rotary motion, it lifts the locking end 12 into an unlocking position. In the process, the side faces 52 and 53 (FIG. 13b) of the end 19" snap onto the component 2 and the spring wire 8, respectively.

Figure 14A:
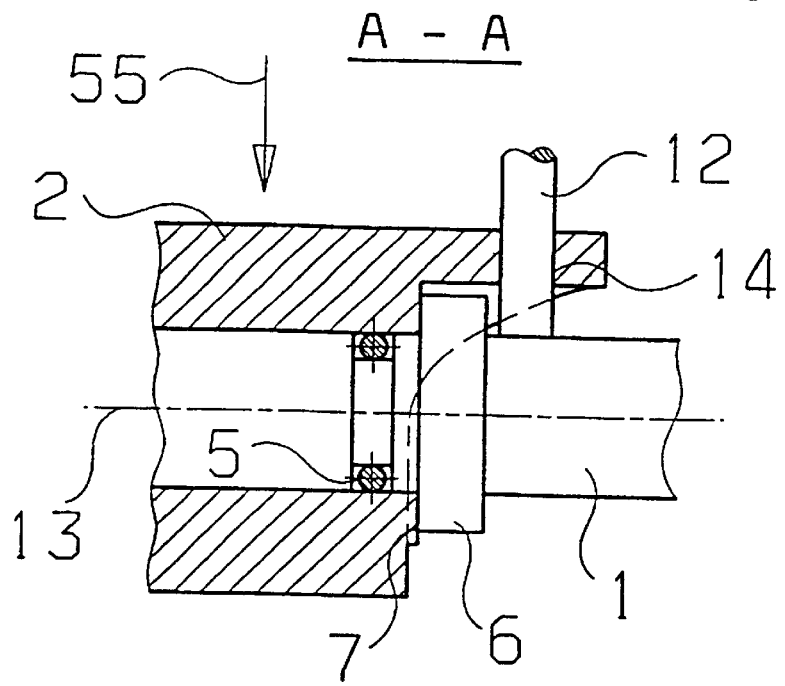
FIG. 14a, a schematic cross section of a variant of the device of FIG. 1a, along the section line A—A in FIG. 14b, in which the tubular component has a partly recessed neck.
Figure 14B:
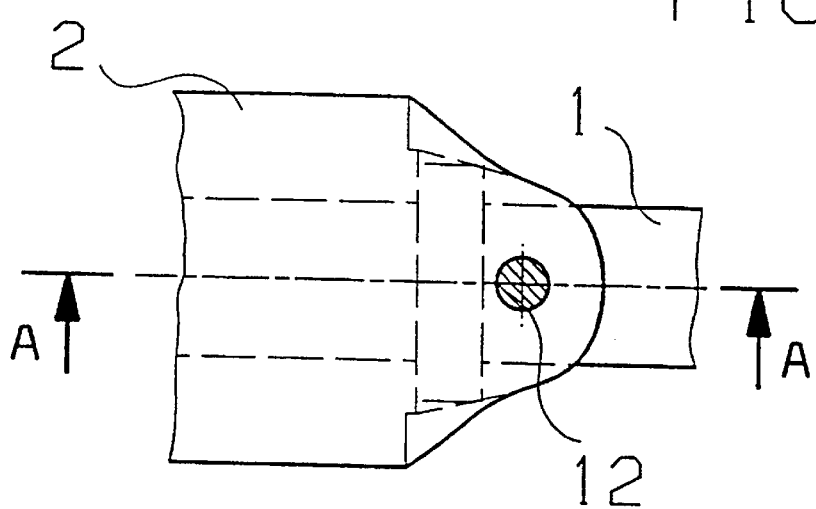

FIG. 14a shows a schematic cross section of a variant of the device of FIG. 1a, in which the same reference numerals indicate corresponding components. In the version of FIG. 1a, after the first tubular component 1 is introduced with the retaining flange 6 into the second tubular component 2, an open interstice remains at the end of the component 2, and this is hard to clean. In the arrangement of FIG. 14a, this interstice is reduced in size, because the end of the component 2 in the region of the opening 14 for the locking end 12 protrudes, but in its remaining region it is recessed back to the stop 7 for the retaining flange 6. FIG. 14b shows a plan view on the device of FIG. 14a in the direction of the arrow 55, the sectional plane in FIG. 14a being designated A—A.

In the exemplary embodiments of the invention shown in FIGS. 1–14, the first tubular component 1 has a smaller outer diameter than the second tubular component 2. A retaining flange 6 is provided as the bracing element on the first component 1, and a bore 14 for the end 12 of the spring wire 8, which is braced as a retaining unit at at least two points in the radial plane 9 and at a further point outside this radial plane 9 on the second component 2, is provided as the opening in the second component 2.

Other embodiments are equally within the scope of independent claim 1. The components 1, 2 can also have equal diameters that differ solely in the coupling region, to make it possible to insert the components 1, 2 into each other. Besides the retaining flange 6, grooves, holes or other recesses that have retaining flanks are also suitable as a bracing element on the first component 1 for the end 12 of the spring wire 8.

The support points for the spring wire 8 can be axially distributed over the first or also the second component 1, 2 or can be limited only to the radial plane 9 and its immediate vicinity. Such a limitation is sufficient if the spring wire 8 is wrapped around the component 1 or 2 with sufficient spring force or is disposed in a groove. The spring wire 8 can also be disposed on the tubular component 1, which carries the bracing element 6. In this case, the component 1 is expediently inserted with a retaining flank of the retaining flange 6 up to a stop 7 in the component 2. Then the locking end 12 of the spring wire 8 can reliably be deflected resiliently in the correct axial position into the opening 14 in the component 2, and this opening locks the end 12 together with the component 1 to the component 2. By suitable blocking and opening devices on the parts, inserted into one another, of the components 1, 2 in the coupling region, it can be attained that the end 12 also finds the opening 14 in the correct angular position.

What is claimed is:

1. A fast-action coupler for coupling a first tubular component (1) having a fluid passage therethrough to a second tubular component (2) having a fluid passage therethrough, in which in the coupling region an outer diameter of the first component (1) is no greater than an inner diameter of the second component (2) for enabling insertion of said first component endwise into said second component to establish fluid communication between said fluid passages and with sealing means being, in the coupled state of said components, provided between the outer surface of said first component and the inner surface of the second component for sealing said fluid passages against the outside, said coupler having at least one bracing element (6) on the first component (1) and at least one opening (14) in the second component (2) for receiving an elastically deformable retaining unit, which is mounted on the first component (1) or on the second component (2) and secures the bracing element (6) against being pulled out in the put-together state of the tubular components (1, 2), characterized in that the retaining unit is embodied as a one-piece spring wire (8), which is braced by a support at at least two points (16, 21, 22) in a radial plane (9) on the outer surface of the first component (1) or second component (2) and at at least one further point (15) inside or outside the radial plane (9) on respectively the first component (1) or second component (2), and has at least one end (12) oriented perpendicular to the axis (13) of respectively the first tubular component (1) or second tubular component (2), which end penetrates at least one opening (14) in the second component (2), locks the bracing element (6) on the first component (1), and can be lifted while said retaining unit remains braced at said points in said radial plane and at said at least one further point, counter to a spring force of the retaining unit, radially into an unlocking position, and wherein said at least one bracing element (6) on the first component (1) is a retaining flange, and the radial plane (9) having the at least two support points (16, 21, 22), for securing the spring wire (8) to the second tubular component (2), is located axially between the further support point (15) that is spaced apart from the radial plane (9) and the opening (14) at which the end (12) of the spring wire (8) that locks the retaining flange (6) penetrates the second tubular component (2).

2. The device of claim 1, characterized in that the spring wire (8), in the region of its support at at least two points (16, 21, 22) in the radial plane (9), takes the form of a ring that at least partly surrounds the outer circumference of the second component (2).

3. The device of claim 2, characterized in that the spring wire (8), adjoining the ring that surrounds the second tubular component (2), takes the form of a spiral (31, 32) that comprises at least two windings.

4. A fast-action coupler for coupling a first tubular component (1) having a fluid passage therethrough to a second tubular component (2) having a fluid passage therethrough, in which in the coupling region an outer diameter of the first component (1) is no greater than an inner diameter of the second component (2) for enabling insertion of said first component endwise into said second component to establish fluid communication between said fluid passages and with sealing means being, in the coupled state of said components, provided between the outer surface of said first component and the inner surface of the second component for sealing said fluid passages against the outside, said coupler having at least one bracing element (6) on the first component (1) and at least one opening (14) in the second component (2) for receiving an elastically deformable retaining unit, which is mounted on the first component (1) or on the second component (2) and secures the bracing element (6) against being pulled out in the put-together state of the tubular components (1, 2), characterized in that the retaining unit is embodied as a one-piece spring wire (8), which is braced by a support at at least two points (16, 21, 22) in a radial plane (9) on the outer surface of the first component (1) or second component (2) and at at least one further point (15) inside or outside the radial plane (9) on respectively the first component (1) or second component (2), and has at least one end (12) oriented perpendicular to the axis (13) of respectively the first tubular component (1) or second tubular component (2), which end penetrates at least one opening (14) in the second component (2), locks the bracing element (6) on the first component (1), and can be lifted while said retaining unit remains braced at said points in said radial plane and at said at least one further point, counter to a spring force of the retaining unit, radially into an unlocking position, and wherein a first part of the spring wire (8) is located in the radial plane (9) with at least two support points (16, 21, 22), and a second part (11) is located in a plane (10) which extends perpendicular to this radial plane (9) and contains a common axis (13) of the two tubular components (1, 2).

5. A fast-action coupler for coupling a first tubular component (1) having a fluid passage therethrough to a second tubular component (2) having a fluid passage therethrough, in which in the coupling region an outer diameter of the first component (1) is no greater than an inner diameter of the second component (2) for enabling insertion of said first component endwise into said second component to establish fluid communication between said fluid passages and with sealing means being, in the coupled state of said components, provided between the outer surface of said first component and the inner surface of the second component for sealing said fluid passages against the outside, said coupler having at least one bracing element (6) on the first component (1) and at least one opening (14) in the second component (2) for receiving an elastically deformable retaining unit, which is mounted on the first component (1) or on the second component (2) and secures the bracing element (6) against being pulled out in the put-together state of the tubular components (1, 2), characterized in that the retaining unit is embodied as a one-piece spring wire (8), which is braced by a support at at least two points (16, 21, 22) in a radial plane (9) on the outer surface of the first component (1) or second component (2) and at at least one further point (15) inside or outside the radial plane (9) on respectively the first component (1) or second component (2), and has at least one end (12) oriented perpendicular to the axis (13) of respectively the first tubular component (1) or second tubular component (2), which end penetrates at least one opening (14) in the second component (2), locks the bracing element (6) on the first component (1), and can be lifted while said retaining unit remains braced at said points in said radial plane and at said at least one further point, counter to a spring force of the retaining unit, radially into an unlocking position, and wherein the spring wire (8), in the region of its support at at least two points (16, 21, 22) in the radial plane (9), takes the form of a ring that at least partly surrounds the outer circumference of the second component (2), the spring wire (8), adjoining the ring that surrounds the second tubular component (2), takes the form of a spiral (31, 32) that comprises at least two windings, and at least one part (32) of the spiral has windings that successively widen conically, and the locking end (12) of the spring wire (8) adjoins the last winding (34) having the largest diameter.

6. A fast-action coupler for coupling a first tubular component (1) having a fluid passage therethrough to a second tubular component (2) having a fluid passage therethrough, in which in the coupling region an outer diameter of the first component (1) is no greater than an inner diameter of the second component (2) for enabling insertion of said first component endwise into said second component to establish fluid communication between said fluid passages and with sealing means being, in the coupled state of said components, provided between the outer surface of said first component and the inner surface of the second component for sealing said fluid passages against the outside, said coupler having at least one bracing element (6) on the first component (1) and at least one opening (14) in the second component (2) for receiving an elastically deformable retaining unit, which is mounted on the first component (1) or on the second component (2) and secures the bracing element (6) against being pulled out in the put-together state of the tubular components (1, 2), characterized in that the retaining unit is embodied as a one-piece spring wire (8), which is braced by a support at at least two points (16, 21, 22) in a radial plane (9) on the outer surface of the first component (1) or second component (2) and at at least one further point (15) inside or outside the radial plane (9) on respectively the first component (1) or second component (2), and has at least one end (12) oriented perpendicular to the axis (13) of respectively the first tubular component (1) or second tubular component (2), which end penetrates at least one opening (14) in the second component (2), locks the bracing element (6) on the first component (1), and can be lifted while said retaining unit remains braced at said points in said radial plane and at said at least one further point, counter to a spring force of the retaining unit, radially into an unlocking position, and wherein the longitudinal axis of the locking end (12) of the spring wire (8), which end is oriented perpendicular to a common axis (13) of the tubular components (1, 2), intersects this common axis (13).

7. A fast-action coupler for coupling a first tubular component (1) having a fluid passage therethrough to a second tubular component (2) having a fluid passage therethrough, in which in the coupling region an outer diameter of the first component (1) is no greater than an inner diameter of the second component (2) for enabling insertion of said first component endwise into said second component to establish fluid communication between said fluid passages and with sealing means being, in the coupled state of said components, provided between the outer surface of said first component and the inner surface of the second component for sealing said fluid passages against the outside, said coupler having at least one bracing element (6) on the first component (1) and at least one opening (14) in the second component (2) for receiving an elastically deformable retaining unit, which is mounted on the first component (1) or on the second component (2) and secures the bracing element (6) against being pulled out in the put-together state of the tubular components (1, 2), characterized in that the retaining unit is embodied as a one-piece spring wire (8), which is braced by a support at at least two points (16, 21, 22) in a radial plane (9) on the outer surface of the first component (1) or second component (2) and at at least one further point (15) inside or outside the radial plane (9) on respectively the first component (1) or second component (2), and has at least one end (12) oriented perpendicular to the axis (13) of respectively the first tubular component (1) or second tubular component (2), which end penetrates at least one opening (14) in the second component (2), locks the bracing element (6) on the first component (1), and can be lifted while said retaining unit remains braced at said points in said radial plane and at said at least one further point, counter to a spring force of the retaining unit, radially into an unlocking position, and wherein a part of the spring wire (8) located outside said radial plane (9) has a spiral (25), whose axis (26) is perpendicular to a plane containing the common axis (13) of the tubular components (1, 2).

8. A fast-action coupler for coupling a first tubular component (1) having a fluid passage therethrough to a second tubular component (2) having a fluid passage therethrough, in which in the coupling region an outer diameter of the first component (1) is no greater than an inner diameter of the second component (2) for enabling insertion of said first component endwise into said second component to establish fluid communication between said fluid passages and with sealing means being, in the coupled state of said components, provided between the outer surface of said first component and the inner surface of the second component for sealing said fluid passages against the outside, said coupler having at least one bracing element (6) on the first component (1) and at least one opening (14) in the second component (2) for receiving an elastically deformable retaining unit, which is mounted on the first component (1) or on the second component (2) and secures the bracing element (6) against being pulled out in the put-together state of the tubular components (1, 2), characterized in that the retaining unit is embodied as a one-piece spring wire (8), which is braced by a support at at least two points (16, 21, 22) in a radial plane (9) on the outer surface of the first component (1) or second component (2) and at at least one further point (15) inside or outside the radial plane (9) on respectively the first component (1) or second component (2), and has at least one end (12) oriented perpendicular to the axis (13) of respectively the first tubular component (1) or second tubular component (2), which end penetrates at least one opening (14) in the second component (2), locks the bracing element (6) on the first component (1), and can be lifted while said retaining unit remains braced at said points in said radial plane and at said at least one further point, counter to a spring force of the retaining unit, radially into an unlocking position, and wherein said at least one bracing element (6) on the first component (1) is a retaining flange, and in that the second tubular component (2), on its insertion end, on one side of its longitudinal axis, has a protrusion like extension of its jacket to form a lengthened jacket end which extends axially farther than a short jacket end of the second tubular component, in which lengthened jacket end the opening (14) for the locking end (12) of the spring wire (8) is disposed, and wherein the tubular components (1, 2) can be put together only far enough that the retaining flange (6) on the first tubular component (1) is flush with the short jacket end (7) of the second tubular component (2) and can be locked through the opening (14) in the lengthened jacket end.

9. A fast-action coupler for coupling a first tubular component (1) having a fluid passage therethrough to a second tubular component (2) having a fluid passage therethrough, in which in the coupling region an outer diameter of the first component (1) is no greater than an inner diameter of the second component (2) for enabling insertion of said first component endwise into said second component to establish fluid communication between said fluid passages and with sealing means being, in the coupled state of said components, provided between the outer surface of said first component and the inner surface of the second component for sealing said fluid passages against the outside, said coupler having at least one bracing element (6) on the first component (1) and at least one opening (14) in the second component (2) for receiving an elastically deformable retaining unit, which is mounted on the first component (1) or on the second component (2) and secures the bracing element (6) against being pulled out in the put-together state of the tubular components (1, 2), characterized in that the retaining unit is embodied as a one-piece spring wire (8), which is braced by a support at at least two points (16, 21, 22) in a radial plane (9) on the outer surface of the first component (1) or second component (2) and at at least one further point (15) inside or outside the radial plane (9) on respectively the first component (1) or second component (2), and has at least one end portion (12) oriented perpendicular to the axis (13) of respectively the first tubular component (1) or second tubular component (2), which end penetrates at least one opening (14) in the second component (2), locks the bracing element (6) on the first component (1), and can be lifted while said retaining unit remains braced at said points in said radial plane and at said at least one further point, counter to a spring force of the retaining unit, radially into an unlocking position, and wherein the end portion (12) of said spring wire (8) moves in the direction of its length to penetrate said opening (14) in the second component, and the edges of said opening (14) completely surround the periphery of the inserted end portion (12) of the spring wire (8).

10. The device of claim 9, characterized in that on the locking end the spring wire (8) of the retaining unit has a portion (30) which, as a switching point, enables lifting of the end (12) by means of a tool (19) for the sake of unlocking.

11. The device of claim 10, characterized in that the portion of the switching point (30) in the locked state has a free height above the outer circumference of the second tubular component (2) that is less than the outer diameter (D) of this second component (2).

12. The device of claim 9, characterized in that the longitudinal axis of the locking end (12) of the spring wire (8), which end is oriented perpendicular to the common axis (13) of the tubular components (1, 2), extends past this common axis (13) at a distance from it.

13. The device of claim 9, characterized in that a part (11") of the spring wire (8) located outside the radial plane (9) has a serpentine course.

14. The device of claim 9, characterized in that the spring wire (8) has a cross section of circular shape.

15. The device of claim 9, characterized in that the spring wire (8) has a cross section of rectangular shape.

16. The device of claim 9, characterized in that said sealing means (5) includes at least one O-ring that accomplishes radial sealing between said outer surface of said first component and said inner surface of said second component when said first component when the first component is inserted endwise into said second component.

17. A fast-action coupler for coupling a first tubular component (1) having a fluid passage therethrough to a second tubular component (2) having a fluid passage therethrough, in which in the coupling region an outer diameter of the first component (1) is no greater than an inner diameter of the second component (2) for enabling insertion of said first component endwise into said second component to establish fluid communication between said fluid passages and with sealing means being, in the coupled state of said components, provided between the outer surface of said first component and the inner surface of the second component for sealing said fluid passages against the outside, said coupler having at least one bracing element (6) on the first component (1) and at least one opening (14) in the second component (2) for receiving an elastically deformable retaining unit, which is mounted on the first component (1) or on the second component (2) and secures the bracing element (6) against being pulled out in the put-together state of the tubular components (1, 2), characterized in that the retaining unit is embodied as a one-piece spring wire (8), which is braced by a support at at least two points (16, 21, 22) in a radial plane (9) on the outer surface of the first component (1) or second component (2) and at at least one further point (15) inside or outside the radial plane (9) on respectively the first component (1) or second component (2), and has at least one end (12) oriented perpendicular to the axis (13) of respectively the first tubular component (1) or second tubular component (2), which end penetrates at least one opening (14) in the second component (2), locks the bracing element (6) on the first component (1), and can be lifted while said retaining unit remains braced at said points in said radial plane and at said at least one further point, counter to a spring force of the retaining unit, radially into an unlocking position, and wherein all of the said points (15, 16, 21 and 22) for support of said spring wire are provided by disposing a spiral portion (31) of said spring wire about and in contact with the outer surface of said second tubular component, with the spiral beginning at an end of the spring wire and progressing longitudinally away from said opening (14), and the opposite end of the spiral joins a straightened part (41) of the spring wire that extends above the entire length of the spiral to join with said perpendicularly oriented end (12) that penetrates said opening (14).

18. The device of claim 17, characterized in that the length of said straightened part (41) of the spring wire is greater than the axial length of said spiral to provide an open switching area between the outer surface of the second tubular component and said straightened part for the insertion of a tool for lifting the locking end (12) of the spring wire out of said opening (14).

19. The device of claim 18, characterized in that the width of said switching area is larger than the height of spring wire above the surface of second tubular component to permit insertion of a rectangular tool into said switching area so that, upon angular turning of said tool, controlled flexing of said spring wire can be effected to switch between the locked and unlocked states.

20. A fast-action coupler for coupling a first tubular component (1) having a fluid passage therethrough to a second tubular component (2) having a fluid passage therethrough, in which in the coupling region an outer diameter of the first component (1) is no greater than an inner diameter of the second component (2) for enabling insertion of said first component endwise into said second component to establish fluid communication between said fluid passages and with sealing means being, in the coupled state of said components, provided between the outer surface of said first component and the inner surface of the second component for sealing said fluid passages against the outside, said coupler having at least one bracing element (6) on the first component (1) and at least one opening (14) in the second component (2) for receiving an elastically deformable retaining unit, which is mounted on the first component (1) or on the second component (2) and secures the bracing element (6) against being pulled out in the put-together state of the tubular components (1, 2), characterized in that the retaining unit is embodied as a one-piece spring wire (8), which is braced on the outer surface of the first component (1) or second component (2) by forming a spiral of at least 360° which is coaxial to the first component (1) or second component (2) and resiliently rests on respectively the first or second component, and has at least one end (12) oriented perpendicular to the axis (13) of respectively the first tubular component (1) or second tubular component (2), which end penetrates at least one opening (14) in the second component (2), locks the bracing element (6) on the first component (1), and can be lifted while said retaining unit remains braced on the outer surface of the first component (1) or second component (2) and at least at one further point, counter to a spring force of the retaining unit, radially into an unlocking position.

21. Apparatus for releasably coupling a first fluid line to a second fluid line, comprising:

first and second tubular coupler components each having a free coupling end and an opposite end for attachment respectively to end portions of said fluid lines to establish fluid communication between the interiors of said fluid lines and internal passages extending through said first and second components, said first component having a coupling end region in which a diameter of its outer surface is no greater than an inner diameter of said second component to permit endwise insertion of said coupling end region of said first component into said second component, the outer surface of said first component being provided with a radially protruding stop at a location spaced from the free coupling end of said first component to abut against said second component when said first component has been fully inserted into said second component, and said second component being provided at its free coupling end portion with an axially extending outer wall overlying said stop when said first component has been fully inserted into said second component, and said outer wall having a radial opening therethrough at a location axially beyond said stop; and a spring wire retainer attached to one of said first and second components and having a first end portion for radial insertion through said radial opening in said outer wall portion of said second component far enough to position said end portion to block the path of said stop against separation of said first and second components, said spring wire retainer having adjacent to said first end portion an elongated portion extending longitudinally along said first and second components, said elongated portion being biassed to press said end portion inwardly but being spaced outwardly from the surfaces of said first and second components to permit insertion of a tool for flexing the spring wire in a direction to withdraw said end portion radially from said radial opening in said outer wall portion of said second component, and said spring wire retainer having a second opposite end portion anchored on one of said first and second components in both the joined-together and the separated states of said first and second components.

* * * * *